//UNITED STATES PATENT OFFICE.

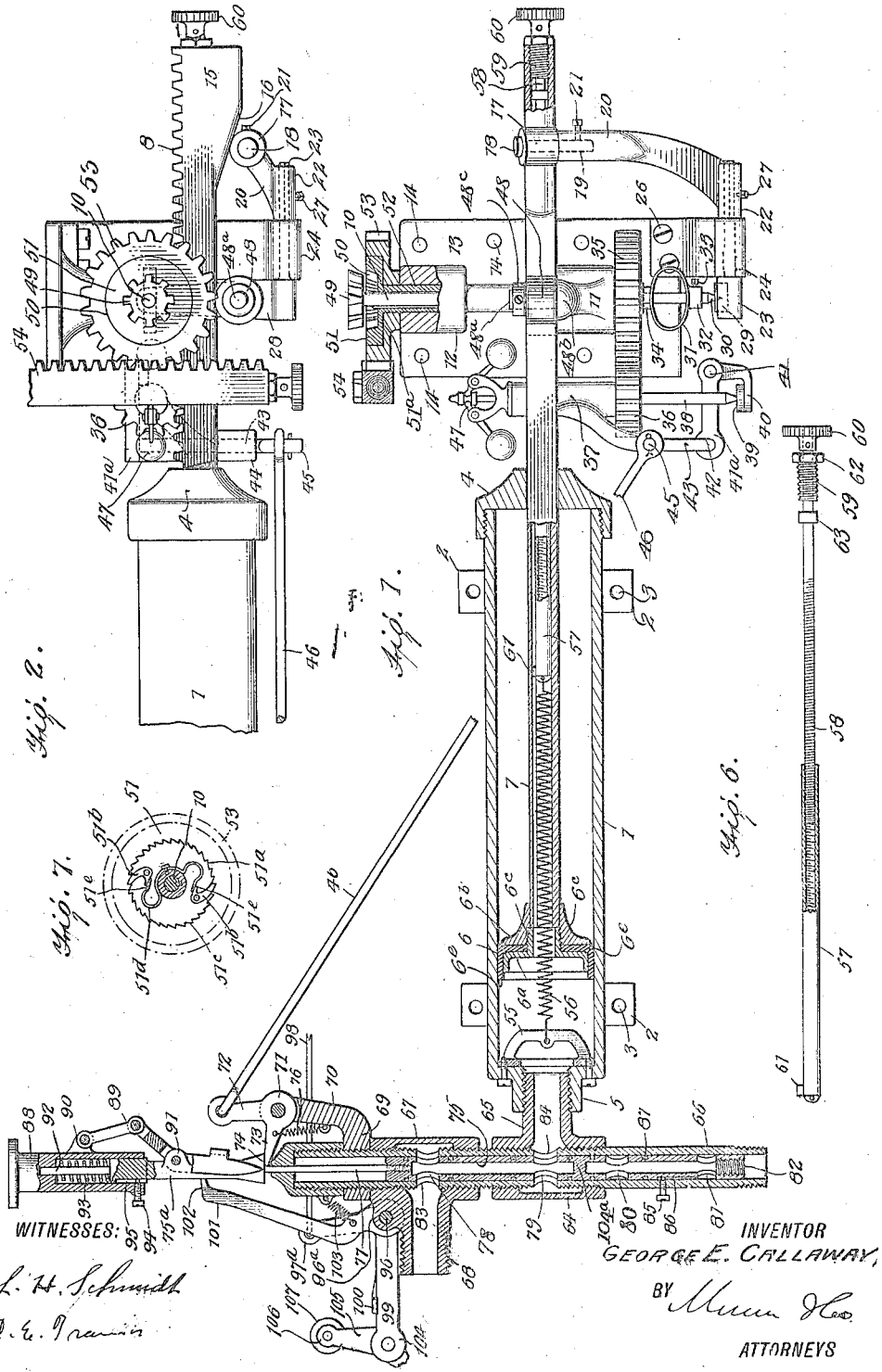

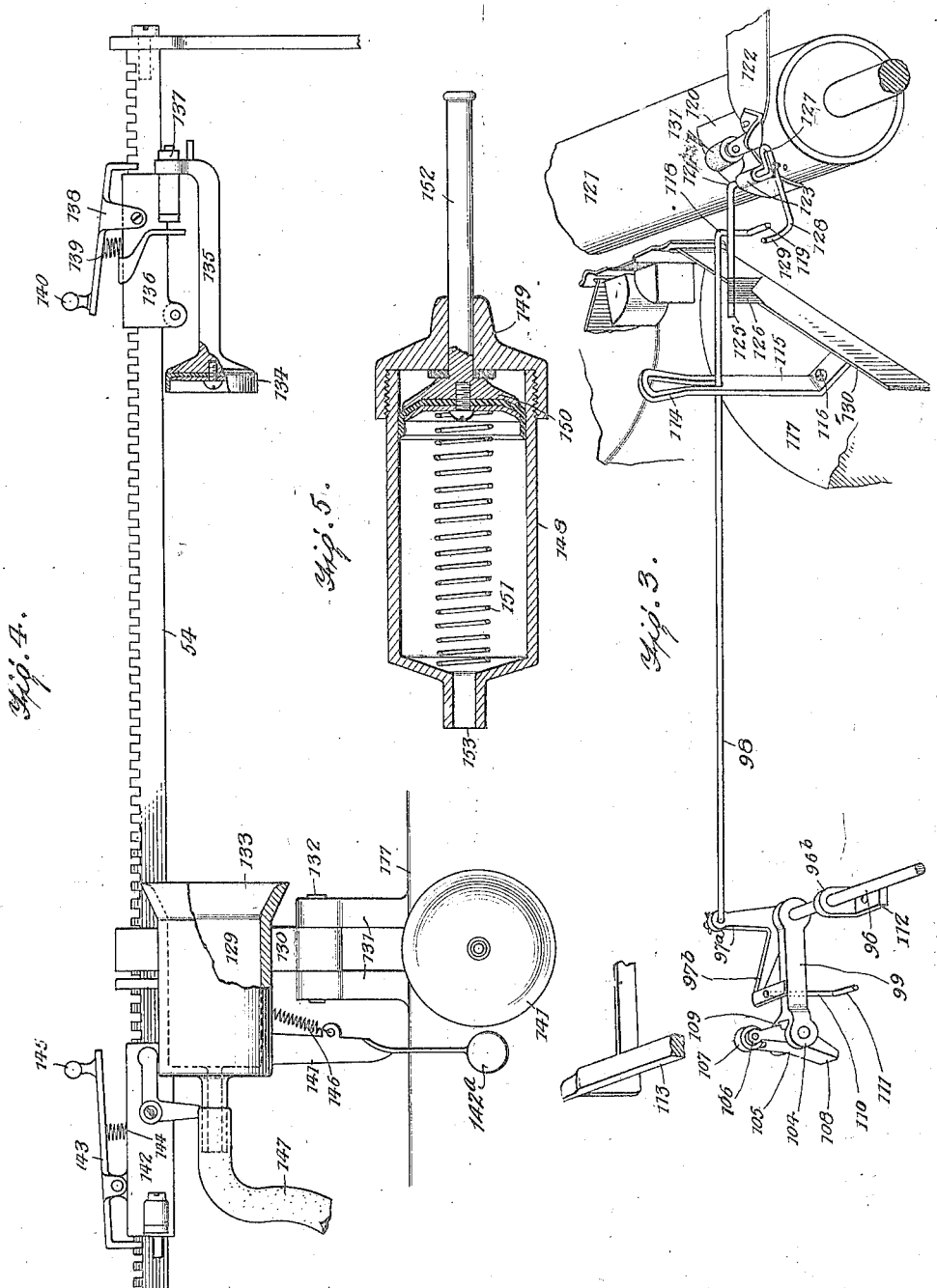

GEORGE E. CALLAWAY, OF DE SOTO PARISH, LOUISIANA.

PNEUMATIC TYPE-WRITER CARRIAGE.

1,208,477.

Specification of Letters Patent.

Patented Dec. 12, 1916.

Application filed March 31, 1916. Serial No. 88,066.

*To all whom it may concern:*

Be it known that I, GEORGE E. CALLAWAY, a citizen of the United States, and a resident of De Soto parish, State of Louisiana, have invented certain new and useful Improvements in Pneumatic Type-Writer Carriages, of which the following is a specification.

My invention is an improvement in pneumatic typewriter carriages, and consists in certain novel constructions and combinations of parts hereinafter described and claimed.

The object of the invention is to provide an automatic fluid pressure operated means for returning the carriage quickly when it reaches the end of its movement in one direction, and to also provide means for cushioning the return of the carriage.

Referring to the drawings forming a part hereof, Figure 1 is a vertical section of the improvement; Fig. 2 is a partial plan view; Fig. 3 is a perspective view of the tripping mechanism; Fig. 4 is a plan view of the cushioning device; Fig. 5 is a longitudinal section of the cushioning cylinder; Fig. 6 is a sectional view of means for varying the tension of the spring for returning the parts to normal position; and Fig. 7 is a detail perspective view of the pawl and ratchet connection between the disk and the gear wheel.

In the embodiment of the invention shown in the drawings a cylinder 1 is provided having near each end lateral lugs 2 provided with openings 3 for receiving screws or bolts, whereby the cylinder may be secured to the typewriter frame at one side thereof, the right side preferably. The cylinder is provided at one end with a head 4 threaded thereon and at the other with a nipple 5.

A piston 6 is slidable in the cylinder, and the rod 7 of the piston is hollow as shown, and square in cross section, and extends through the head 4. One face of the outer end of the rod is provided with rack teeth 8 which engage with a pinion 9 on a shaft 10 running at right angles to the rod and journaled in bearings 11 and 12 on a plate 13 having openings 14 to receive screws or bolts in order to attach the plate to the typewriter. The outer end of the piston rod is enlarged, as at 15, and the lower face of the enlargement is inclined, as shown at 16, and is engaged by a roller 17 journaled on a pin 18 which extends into a longitudinal recess 19 in an arm 20 and is secured in place by a set-screw 21. The arm extends laterally from a hub 22, which is seated on one end of a pin 23 which passes through a bearing 24 on a bracket 25 extending from the plate 13 and secured thereto by screws 26, and the hub is held in place by a set-screw 27.

An arm 28 extends laterally from the pin on the opposite side of the bearing 24, and the end of the arm is provided with a recess bearing 29, in which is seated the pointed end 30 of the shaft 10 before mentioned. An annular spring 31 is arranged between a sleeve 32 secured in place on the shaft by a set-screw 33, and the bearing, and acts normally to hold the shaft in lowered position.

A friction roller 48 is secured to a shaft 48$^a$ and engages the front face of the piston rod to retain the teeth of the rod in mesh with the pinion. The shaft is journaled in a bearing 48$^b$, and a collar 48$^c$ is secured on the upper end of the shaft by a set-screw. To the lower end of the shaft is secured a gear wheel 35 which meshes with a pinion 36 on a governor shaft 37. The said shaft is journaled in a bearing 37 on the plate and is also movable longitudinally in the bearing. The lower end of the governor shaft is pointed and rests in a recess on a disk 39, which is supported on one arm 40 of a rock shaft 41, the other arm 41$^a$ of which is pivoted to an arm 42 on a shaft 43 journaled at right angles to the governor shaft in a bearing 44 and having a second arm 45, to which is pivoted one end of a link 46. The opposite end of the governor shaft has connected therewith an ordinary form of ball governor 47. The piston rod 7 is held with the rack teeth in mesh with the pinion by means of a roller 48 engaging the front face thereof, and the upper end of the shaft 10 is provided with a pinion 49 which, when the shaft is lowered, is received in a similarly shaped socket 50 in a disk 51 having a hub 52 encircling the shaft, and the disk is received in a circular recess in the face of a gear wheel 53. The disk is connected to the gear wheel by a clutch or pawl and ratchet mechanism, so that the disk may move freely with respect to the gear wheel in one direction, but carries the said wheel with it when it moves in the opposite direction. The disk is provided with a circular central recess 51$^a$ in its upper face, and a pair of oppositely engaged pawls 51$^b$ are pivoted to the under face of the disk and engage a series of ratchet teeth 51$^c$ in the side wall of the recess. The pawls are pressed into engagement with the teeth by a spring 51$^d$, each having a lug 51$^e$ with which one end of the spring engages, the central portion of the spring being secured to the hub of the disk.

The gear wheel 53 meshes with the teeth of a rack bar 54 arranged at right angles to the piston rod, and the rack bar is connected with the carriage of the typewriter for moving the same. A spider 55 is arranged in the cylinder adjacent to the nipple 5, and a spring 56 is secured at one end to the spider and extends through the hollow piston rod to a connection with a hollow internally threaded rod 57 in the piston rod. The opposite end of the rod is engaged by a screw rod 58 journaled in a screw plug 59, which is threaded into the outer end of the piston rod, and the rod has a head 60 for manipulating the same. The spring acts normally to draw the piston toward the spider, and the tension may be regulated by turning the head, and the rod 57 is guided by the engagement of a lateral lug 61 thereon with a groove in the piston rod. The plug 59 is provided with a polygonal head 62 and the rod with an annular rib 63 fitting the bore of the piston rod.

It will be evident that when the piston is drawn to the left of Fig. 1 by the spring the shaft 10 will be rotated, and the pawl and ratchet arrangement is such that the rack bar 54 will not be moved. As soon, however, as the cam surface 16 engages the roller 17, the gear 49 will be lifted out of engagement with the socket and will disconnect the piston from the disk 51, so that the carriage may be moved by hand. The piston is composed of two heads 6$^a$ and 6$^b$, each having a hub portion 6$^c$, the hub of the head 6$^a$ being threaded into the hub of the head 6$^b$, and a packing 6$^e$ is arranged between the heads.

A T 64 has its lateral branch 65 threaded into the nipple 5, and a pipe 66 is threaded into the T and extends above and below the same. A second T 67 is threaded onto the pipe above the T 64, and the lateral branch 68 thereof may be connected with a suitable source of fluid under pressure. A ring 69 encircles the pipe above the T 67, and a bracket arm 70 extends upwardly and outwardly therefrom. An elbow lever 71 is pivoted on the bracket arm, and one of the arms 72 thereof is pivoted to the end of the link 46 before mentioned, the other arm 73 being pointed and engaging beneath a shoulder 74 on the head 75$^a$ of a hollow valve 75 slidable in the pipe 66. A spring 76 is arranged between the arm 73 and the bracket arm, normally retaining the elbow lever in the position shown in Fig. 1.

The head 75$^a$ of the valve is connected to the valve by a rod 77, which is threaded into the closed upper end of the valve, and the said valve is provided with a plurality of ports 78, 79, 80 and 81, the lower end being closed by a threaded plug 82. The pipe 66 is provided with ports 83 and 84, the former opposite the T branch 68 and the latter opposite the T branch 65, and the valve is prevented from turning by a set-screw 85 threaded through the pipe and engaging a groove 86 therein. The valve is also provided with packing rings 87 arranged on each side of the ports, and the head thereof extends into a cap 88 which is connected to the head by toggle levers 89, the ends of the toggle levers being pivoted to lugs 90 and 91 on the cap and head, respectively. A rod 92 extends upwardly from the head and is slidable in a recess in the cap, and a spring 93 encircles the rod, bearing at one end against the cap and at the other against the head. The head is prevented from turning by a set-screw 94 threaded through the side thereof and engaging a groove 95 in the head.

A shaft 96 is journaled in bearings 96$^a$ on the lateral branch 68, and a bearing 96$^b$ on a plate 112 (Fig. 3), and is provided with an arm 101 extending upwardly and having at its upper end an angular tooth 102 which is adapted to engage beneath the shoulder 74, when the valve is raised, to retain the valve in such position that the air will be cut off from the cylinder. The shaft is also provided with a laterally extending arm 99, having at its free end spaced lugs 104, between which is journaled a rocker bar 105. The bar is provided at its upper end with spaced lugs 106, and a roller 107 is journaled between the arms, and the lower end of the bar is formed into a toe 108. The swinging movement of the bar is limited by shoulders 109 above and below the arm 99. An elbow lever is journaled on the end of the shaft adjacent to the arm 99, one arm 97$^a$ therefrom being pivoted to a link 98, while the other arm 97$^b$ is provided with a lateral extension overlying the arm 99, and provided with a depending rod 110 having an angular portion 111.

A partition 104 separates the bore of the valve into an upper or inlet portion, and a lower or exhaust portion, and each of the ports 78, 79, 80 and 81, 83 and 84 is double, that is, extends entirely through the pipe and the valve, to balance the pressure on the valve. When the valve is in the position shown in Fig. 1, the ports 78 and 83 register, as do also the ports 79 and 84, and the fluid is free to pass from the branch 68 through the ports into the cylinder. Should the speed of the piston's movement become excessive, the governor depresses the shaft 38 and swings the rock shafts 41 and 43, and also the elbow lever 71, by means of the link 46. The valve is then lifted and the ports are brought out of register with each other, thus shutting off the air and checking the movement of the piston.

Fluid is admitted to the cylinder by means of the engagement of the usual spacing bar 113 of the typewriter with the roller 107 of the rocker bar 105. When the roller engages the spacing bar, the shaft 96 is oscillated to swing the tooth 102 out of engagement with the shoulder 74. The spring 93 then forces the valve downwardly until the ports 83—78 and 84—79 register, the fluid thus having free access to the cylinder. As the piston moves to the right the rack bar 54 is moved longitudinally, and as it is connected with the carriage the carriage is returned to its position at the right of the machine. The rocker bar 105 is thrown up into the position shown in Fig. 3 by the engagement of the portion 111 of the wire 110 with mechanism to be described. The rocker bar is thrown down and out of engagement with the spacer bar by the engagement of the toe 108 with the floor of the keyboard.

The link 98 passes through a loop 114 on a plate 115 secured by a screw 116 to the top of the typewriter 117, and the free end thereof is provided with a depending portion 118 having a lateral bend 119. A curved plate 120 is supported adjacent to the peripheral surface of the roller 121 by a bracket 122, and the plate is provided with a bearing 123 in which is supported a rod 124 having at one end an angular portion 125 supporting a red flag 126. The other end is bent backwardly and doubled forward, as at 127, and thence laterally, as at 128, and upwardly, as at 129, into position for engagement by the angular portion 119 of the link 98. The loop 114 supports the link above the inking ribbon 130 of the typewriter, and a small rubber roller 131 is journaled on the plate.

When the carriage and roller near the end of the written line on the paper, the rod carrying the flag engages the end of the link 98, and the said rod is swung in its bearing to bring the flag into upright position, the rod bearing against the roller 131. This warns the operator that the end of the line is near, and at the same time swings the elbow lever 97 and raises the rocker bar into the position shown in Fig. 3 ready for engagement with the spacer bar. The arrangement is such that one or more characters may be then printed, after which the operator strikes the spacing bar which trips the mechanism just described and permits the valve to drop to admit the air to the cylinder, and return the carriage. To cushion the return, the mechanism shown in Figs. 4 and 5 is provided. The said mechanism comprises a cylinder 129 supported on the frame 117 of the typewriter, by means of a bar 130 secured to the cylinder, and pivoted between the lugs 131 on the frame by a pin 132. The cup has a flaring open end 133, and a piston 134 is secured to the end of an arm 135 pivoted at 137 to a sleeve 136 on the rack bar 54.

The piston has a cup-shaped inner end, and is adapted to engage and enter the cylinder. The sleeve 136 is slidable on the rack bar, and a pawl 138 is pivoted on the sleeve and engages the rack bar teeth to permit the adjustment of the sleeve. A spring 139 presses the pawl into engagement with the teeth, and a knob 140 is provided for manipulating the pawl.

A bell 141 is supported on the frame, and a hammer 142ª depends from a sleeve 142 slidable on the rack bar, and having a pawl 143 pivoted thereto and pressed into engagement with the teeth of the bar by a spring 144. A knob 145 is provided for manipulating the pawl, and a spring 146 presses the hammer toward the bell. A flexible pipe 147 leads from the cylinder to the end of the pipe 66, so that when the piston is forced into the cylinder the air therein is forced through the pipe and into the pipe 66, lifting the valve and shutting off the fluid.

In Fig. 5 the cylinder 148 is provided with a head 149 threaded thereon, and a piston 150 is movable in the cylinder against the resistance of a spring 151. The stem 152 of the piston extends through the head and is adapted for engagement with any suitable means on the bar for moving the piston in the cylinder. The cylinder is provided with a nipple 153, which may be connected with the pipe 66.

The above described cylinder may be substituted for the cylinder shown in Fig. 4, if desired. In either form, when the carriage is near the end of its return movement, the piston enters the cylinder, or the rack bar engages the stem of the piston, moving the said piston inwardly against the resistance of the air, and the spring also in Fig. 5, thus checking the carriage yieldingly to prevent injury of the parts and at the same time lifting the valve to cut off the supply of fluid.

In the use of the device, when a line is near completion, the flag is raised and the bell tapped to warn the operator. When ready to return the carriage the operator moves the spacing bar, which oscillates the shaft 96, and trips the valve. Fluid under pressure enters the cylinder, moves the piston outwardly and through the connection of the piston rod and rack bar the said bar is operated to return the carriage. The carriage is checked yieldingly when in proper position, and the valve is lifted by the same mechanism to shut off the supply of fluid and to permit the fluid in the cylinder to exhaust. As the fluid exhausts, the spring draws the piston back to its original position, the pawl and ratchet connection between the disk and the gear wheel permitting the piston rod to move in its return movement without affecting the rack bar. As the piston nears the end of its return movement, the cam surface 16 on the piston rod swings the roller 17 and lifts the shaft 10, so that the gear wheel 49 is disengaged from the disk, and releases the carriage from the automatic operating mechanism, so that it may be moved to the opposite end in the usual manner and without interference by the operating mechanism.

I claim:

1. The combination with the carriage of the typewriter, of a cylinder, a piston therein, a rod connected with the piston and extending through one end of the cylinder and provided with rack teeth, a shaft, a pinion on the shaft engaging the rack teeth, a disk on the shaft, a clutch connected between the disk and the shaft, a gear wheel on the shaft, a rack bar connected with the carriage and engaged by the gear wheel, a valve for admitting motive fluid to the opposite end of the cylinder from the shaft, whereby to move the piston outwardly to operate the rack bar, a spring for returning the piston, a pawl and ratchet connection between the gear wheel and the shaft to connect the disk with the gear wheel when the piston rod moves outwardly, means for releasing the clutch connection between the shaft and the disk when the rod moves inwardly, a spring normally holding the valve opened, a catch for holding the valve closed, a trip for releasing the catch and normally in inoperative position, means for lifting the trip into position for engagement by the spacing bar of the typewriter when the carriage is near the end of its movement in one direction, a cushioning device for checking the return movement of the carriage, and means operated by the said device for moving the valve into closed position.

2. The combination with the carriage of a typewriter, of a rack bar connected therewith, a cylinder, a piston therein, a valve for controlling the admission of motive fluid to one end of the cylinder to move the piston in one direction, a spring for returning the piston, a gear wheel meshing with the rack bar, a rod connected with the piston, a spring normally holding the valve in open position, means for connecting the rod with the gear wheel to rotate the same to return the carriage when the piston is moved outwardly, a spring operated catch normally holding the valve closed, a tripping device for releasing the catch, a cushioning device for checking the return movement of the carriage, and means operated by the said device for moving the valve into position for engagement by the catch to hold the said valve closed.

3. In a device of the character specified, the combination with the carriage of a typewriter, of fluid pressure operated means for returning the carriage, a valve for controlling said means, a spring normally holding the valve in open position, a catch for holding the valve in closed position against the resistance of the spring, a tripping device for releasing the catch to permit the fluid operated means to return the carriage, a cushioning device for checking the carriage at the end of its return movement, means operated by the said device for moving the valve into position for engagement by the catch to hold the said valve closed, a governor operated by the fluid pressure means, means operated by an excess of speed of the governor for partially closing the valve, a spring for returning the fluid operated means to normal position, and means operated by the return of the said means for disconnecting the fluid operated means from the carriage.

4. In a device of the character specified, the combination with the carriage of a typewriter, of fluid pressure operated means for returning the carriage, a valve for controlling said means, a spring normally holding the valve in open position, a catch for holding the valve in closed position against the resistance of the spring, a tripping device for releasing the catch to permit the fluid operated means to return the carriage, a cushioning device for checking the carriage at the end of its return movement, means operated by the said device for moving the valve into position for engagement by the catch to hold the said valve closed, a governor operated by the fluid pressure means, means operated by the governor for partially closing the valve when the said governor exceeds a predetermined speed, and a spring for returning the operating means to normal position.

5. In a device of the character specified, the combination with the carriage of a typewriter, of fluid pressure operated means for returning the carriage, a valve for controlling said means, a spring normally holding the valve in open position, a catch for holding the valve in closed position against the resistance of the spring, a tripping device for releasing the catch to permit the fluid operated means to return the carriage, a cushioning device for checking the carriage at the end of its return movement, means operated by the said device for moving the valve into position for engagement by the catch to hold the said valve closed, a governor operated by the fluid pressure means, and means operated by the governor for partially closing the valve when the governor exceeds a predetermined speed.

6. In a device of the character specified, the combination with the carriage, of a typewriter, of fluid pressure operated means for returning the carriage, a valve for controlling said means, a spring normally holding the valve in open position, a catch for holding the valve in closed position against the resistance of the spring, a tripping device for releasing the catch to permit the fluid operated means to return the carriage, a cushioning device for checking the carriage at the end of its return movement, and means operated by the said device for moving the valve into position for engagement by the catch to hold the said valve closed.

7. The combination with the carriage of a typewriter, of normally operative means for returning the carriage, means for restraining the operation of the said means, a tripping device for releasing the restraining means, said device being normally in inoperative position, means operated by the carriage near the end of the outward movement for moving the tripping device into operative position, a cushioning device for checking the carriage at the end of its return movement, means operated by the cushioning device for engaging the restraining means with the returning means, a governor connected with the returning means, means operated by the governor for restraining the operation of the returning means when the carriage moves above a predetermined speed, a spring for returning the carriage returning means to its original position, and means for releasing the carriage from the returning means during the return movement of the said means to original position.

8. The combination with the carriage of a typewriter, of normally operative means for returning the carriage, means for restraining the operation of the said means, a tripping device for releasing the restraining means, a cushioning device for checking the carriage at the end of its return movement, means operated by the cushioning device for engaging the restraining means with the returning means, a governor connected with the returning means, means operated by the governor for restraining the operation of the returning means when the carriage moves above a predetermined speed, a spring for returning the carriage returning means to its original position, and means for releasing the carriage from the returning means during the return movement of the said means to original position.

9. The combination with the carriage of a typewriter, of normally operative means for returning the carriage, means for restraining the operation of the said means, a tripping device for releasing the restraining means, a cushioning device for checking the carriage at the end of the return movement, means operated by the cushioning device for engaging the restraining means with the returning means, a governor connected with the returning means, means operated by the governor for restraining the operation of the returning means when the carriage moves above a predetermined speed, and a spring for returning the carriage returning means to its original position.

10. The combination with the carriage of a typewriter, of normally operative means for returning the carriage, means for restraining the operation of the said means, a tripping device for releasing its restraining means, a cushioning device for checking the carriage at the end of its return movement, means operated by the cushioning device for engaging the restraining means with the returning means, a governor connected with the returning means, and means operated by the governor for restraining the operation of the returning means when the carriage moves above a predetermined space.

11. The combination with the carriage of a typewriter, of normally operative means for returning the carriage, means for restraining the operation of the said means, a tripping device for releasing the restraining means, a cushioning device for checking the carriage at the end of its return movement, and means operated by the cushioning device for engaging the restraining means with the returning means.

12. The combination with the carriage of a typewriter, of normally operative means for returning the carriage, means for restraining the operation of the said means, a tripping device for releasing the returning means, said device being normally in inoperative position, means operated by the carriage near the end of its outward movement for moving the tripping device into operative position, a cushioning device for checking the carriage at the end of its return movement, and means operated by the cushioning device for engaging the restraining means with the returning means.

13. In a device of the character specified, the combination with the carriage of a typewriter, of fluid pressure operated means for returning the carriage, a valve controlling the said means, a spring normally holding the valve open, a catch for holding the valve closed, a pneumatic cushioning device for checking the carriage at the end of its return movement, and means operated by the increase of pressure in the said device for moving the valve into position for engagement by the catch.

14. In a device of the character specified, the combination with the carriage of a typewriter, of fluid pressure operated means for returning the carriage, a valve controlling the said means, a spring normally holding the valve open, a catch for holding the valve closed, a cushioning device for checking the carriage at the end of its return movement, and means operated by the operation of the said device for moving the valve into position for engagement by the catch.

15. In a device of the character specified, the combination with the carriage of a typewriter, of fluid pressure operated means for returning the carriage, a valve controlling the said means, a spring normally holding the valve open, a catch for holding the valve closed, and means operated by the carriage at the end of its return movement for moving the valve into position for engagement by the catch.

16. In a device of the character specified, the combination with a carriage of a typewriter, of fluid pressure operated means for returning the carriage, a valve controlling the said means, a spring normally holding the valve open, a catch for holding the valve closed, a governor operated by the returning means, and means operated by the governor for partially closing the valve when the governor exceeds a predetermined speed.

17. In a device of the character specified, the combination with the carriage of a typewriter, fluid pressure operated means for returning the carriage, a normally open valve for controlling said means, a catch holding the valve closed, a tripping device for releasing the catch, said device being normally in inoperative position, and means operated by the carriage near the end of its outward movement for moving said device into operative position.

18. In a device of the character specified, the combination with the carriage of a typewriter, of fluid pressure operated means for returning the carriage, a normally open valve for controlling said means, a catch holding the valve closed, and a tripping device for releasing the catch, said device being normally in inoperative position.

19. The combination with the carriage of a typewriter, of means for returning the carriage, means for restraining the operation of the said means, a tripping device for releasing the restraining means, a governor operated by the return movement of the carriage, and means operated by the governor when it exceeds a predetermined speed for restraining the operation of the returning means.

20. The combination with the carriage of a typewriter, of means for returning the carriage, means for restraining the operation of the said means, a tripping device for releasing the restraining means, and a governor controlling the speed of movement of the carriage.

21. The combination with the carriage of a typewriter, of means for returning the carriage, means for restraining the operation of the said means, a tripping device for releasing the restraining means, means for checking the carriage at the end of its return movement, and means operated by the checking means for connecting the restraining means with the returning means.

22. The combination with the carriage of a typewriter, of means for returning the carriage, means for restraining the operation of the said means, a tripping device for releasing the restraining means, said device being normally in inoperative position, a signal operated by the carriage at the end of its outward movement, and means operated by the signal for moving the tripping device into operative position.

GEO. E. CALLAWAY.

Witnesses:
W. M. PALLOCK,
S. E. GUY.